Figure 1:
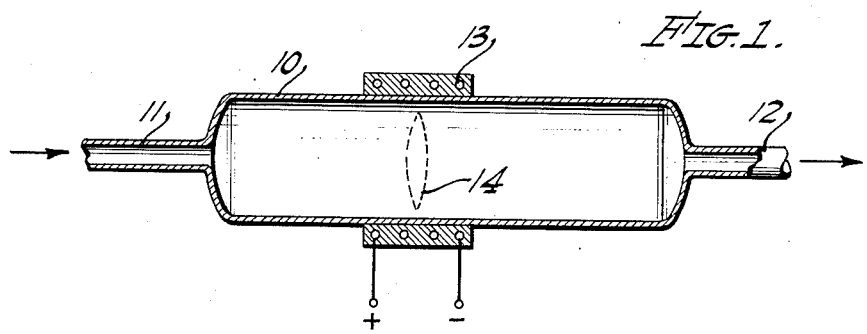

Dec. 2, 1952  A. C. McKINNIS  2,620,259
MANUFACTURE OF HYDROGEN CYANIDE
Filed June 18, 1949

INVENTOR.
ART C. McKINNIS,
BY Richard C. Hartman
ATTORNEY.

Patented Dec. 2, 1952

2,620,259

UNITED STATES PATENT OFFICE 2,620,259

MANUFACTURE OF HYDROGEN CYANIDE

Art C. McKinnis, Long Beach, Calif., assignor to Union Oil Company of California, Los Angeles, Calif., a corporation of California Application June 18, 1949, Serial No. 99,967

6 Claims. (Cl. 23—151)

This invention relates to the manufacture of hydrogen cyanide, and in particular concerns an improved process whereby conditions of high temperature and short reaction time are utilized to obtain high yields of hydrogen cyanide.

It is known that hydrogen cyanide may be obtained by reacting ammonia with a carbonaceous material such as a hydrocarbon or an oxide of carbon at high temperatures. Various means of effecting this reaction have been suggested but none of such methods have proved commercially attractive. For example, it has been proposed to carry out the reaction under the influence of a catalyst such as platinum, but the catalytic processes in general are objectionable in that the effective catalysts very readily become poisoned by relatively minute amounts of impurities in the reaction mixture, thereby requiring that the reactant gases be subjected to expensive purification treatments in order to free them of catalyst poisons. Also, substantial amounts of carbon become deposited on the catalyst during operation over a period of time, thereby necessitating periodic removal and/or regeneration of the catalyst. It has also been proposed to carry out the reaction in the absence of a catalyst at temperatures of the order of 1000°–1500° C. Certain of such processes, however, require the use of an expensive and complicated multitubular apparatus constructed of a refractory material, whereas others are unsatisfactory from the standpoint of the yields realized. For example, in processes whereby a preheated reactant gas mixture comprising ammonia, a hydrocarbon such as natural gas, and air is caused to react in free space at temperatures of 1200°–1500° C., it has been found that at most only about 60 per cent of the ammonia undergoes reaction, and of this 60 per cent only about 85 per cent is converted to the desired product. This corresponds to a yield per pass of about 50 per cent. Higher overall yields may be realized by separating and recycling the unreacted ammonia, but such operations require additional equipment and add to the cost of producing the desired product.

It is accordingly an object of the present invention to provide an improved process for the production of hydrogen cyanide.

Another object is to provide a process whereby the conversion of ammonia to hydrogen cyanide is effected in a highly efficient manner employing simple and inexpensive apparatus.

A further object is to provide means whereby hydrogen cyanide is produced from ammonia in high yields per pass.

Other objects will be apparent from the following detailed description of the invention, and various advantages not specifically referred to herein will be apparent to those skilled in the art upon employment of the invention in practice.

I have found that the above and related objects may be realized in a process whereby a reactant gas mixture comprising ammonia, a halogenated hydrocarbon, and oxygen is subjected to high temperatures such as those prevailing in combustion flames. More particularly, I have found that certain mixtures comprising ammonia, a mono-halogenated aliphatic hydrocarbon such as methyl chloride, and oxygen or an oxygen-containing gas such as air may be ignited and burned in a very simple manner, whereby a large proportion of the ammonia is converted to hydrogen cyanide. The combustion is self-supporting, and accordingly external heating of the reactant gas mixture is not required although it is desirable that the reactant gas be preheated by heat exchange against the hot products of the combustion. The reaction may be carried out in a simple tubular apparatus, and results in conversions of ammonia to hydrogen cyanide of as high as 75–85 per cent per pass. Accordingly, it is not necessary to employ complicated and expensive external heating equipment or to carry out extensive recycling of unreacted components. Furthermore, since the reaction is self-sustaining, it is not necessary to provide means for supplying heat to the reaction as for example by means of side reactions between components of the gas mixture. The invention in its preferred embodiment thus comprises a process whereby a proportioned mixture of ammonia, oxygen, and a mono-halogenated aliphatic hydrocarbon is ignited and burned under controlled conditions to obtain hydrogen cyanide in high yield.

The reaction whereby hydrogen cyanide is formed during the process of the invention may be expressed by the equation:

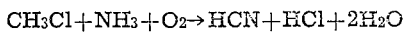

$$CH_3Cl + NH_3 + O_2 \rightarrow HCN + HCl + 2H_2O$$

where methyl chloride is employed as the halogenated hydrocarbon. In a more general form the reaction equation may be written as:

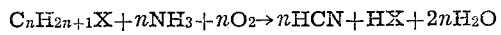

$$C_nH_{2n+1}X + nNH_3 + nO_2 \rightarrow nHCN + HX + 2nH_2O$$

where $n$ represents an integer from 1 to 4 and X represents a halogen atom, e. g., chlorine, bromine, or iodine. It will be noted from this equation that for each mole of halogenated hydrocarbon of $n$ carbon atoms there are required $n$ moles each of ammonia and oxygen. In carrying out the present process it is preferable that the reactants be employed in substantially these same proportions, i. e., the reactant gas mixture should contain from about $0.8n$ moles to about $1.2n$ moles each of ammonia and oxygen per mole of monohalogenated aliphatic hydrocarbon having $n$ carbon atoms. When employing methyl chloride as the halogenated hydrocarbon reactant, as is usually preferred, the reactant gas mixture will preferably comprise equimolecular amounts of methyl chloride, ammonia and oxygen.

The halogenated hydrocarbons suitable for use in the present process are mono-halogenated saturated aliphatic hydrocarbons containing from 1 to 4 carbon atoms, e. g., methyl chloride, ethyl bromide, n-propyl iodide, iso-propyl chloride, n-butyl bromide, iso-butyl chloride, sec.-butyl chloride, tert.-butyl chloride, etc. Methyl chloride is preferred by reason of its general availability and low cost.

The oxygen reactant may be oxygen itself or an oxygen-containing gas such as air or oxygen-enriched air. When an oxygen-containing gas is employed, the reactant gas mixture should be so proportioned as to provide oxygen in the proportions hereinbefore specified, i. e., allowance should be made for inert components.

The reaction by which hydrogen cyanide is formed in the present process does not occur to any appreciable extent at temperatures substantially below the ignition point of the reactant gas mixture. Accordingly, the reaction is preferably carried out simply by burning the reactant gas mixture in a simple tubular burner under such conditions that a free flame is maintained at the end of the burner. Preferably, the burner design and the rate at which the gas mixture is fed to the flame is such that the flame assumes the shape of a thin flat disc having a cross-sectional area considerably larger than its dimension in the direction of its propagation. I have found that when a relatively long conical flame is maintained, the yield of hydrogen cyanide is markedly decreased, presumably because the reaction products become decomposed when subjected to flame temperatures for any substantial period of time. By maintaining the flame in the shape of a thin flat disc the products have a very short transit time within the flame and thus are decomposed to a minimum extent, thereby permitting recovery of the desired product in high yield. In order to maintain a flame of the desired shape the velocity at which the reactant gas mixture is supplied to the flame is maintained at a value only slightly above the velocity of propagation of the flame, which in turn is determined by the composition of the gas mixture. If the reactant gas mixture is supplied at a velocity below that of the velocity of flame propagation, the flame will flash back into the supply line and/or become extinguished. On the other hand, if the gas velocity is substantially greater than the velocity of flame propagation, the flame will be of a long conical form and not of the desired disc-like shape. As is described in my co-pending application Serial No. 20,489, filed April 12, 1948, relating to the manufacture of hydrogen cyanide from non-halogenated hydrocarbons, oxygen and ammonia, a disc-like flame may also be maintained by providing a circumscribing flame of burning hydrocarbon.

Various types of burners may be employed in effecting the combustion reaction whereby the hydrogen cyanide product is formed. Thus, the burner may comprise a simple tube having an open end extending into an enclosed space. The gas mixture is passed through the tube and burned at the open end within the enclosed space, and the combustion products are withdrawn from the enclosed space and treated to separate the various components thereof. Ignition of the gas mixture at the end of the tube may be secured by means of a pilot light or similar device. If desired, a number of such tubular burners may share a common enclosed space. Alternatively, the burner may be of a type illustrated by Figure 1 of the accompanying drawing, consisting of a tubular body portion 10 having a constricted inlet 11 through which the gas mixture is introduced, and a similarly constricted outlet 12 through which the combustion products are withdrawn. Surrounding the body portion is a heating means 13, shown as an electrical heating element, which serves to initially ignite the gas mixture. By proper regulation of the gas velocity and composition, a thin disc-like flame 14 is maintained within the burner. Figure 2 shows a similar type of construction wherein the burner comprises a tubular body portion 20 having constricted inlet and outlet means 21 and 22, respectively. Positioned within the body portion there is provided a porous packing 23 comprised of glass beads, unglazed porcelain, or the like which serves to secure intimate admixing of the reactant gas mixture and as a flame arrestor to prevent the flame from flashing back into the inlet portion of the burner. Ignition of the gas mixture to initiate the flame 24 may be secured by exterior means, not shown, as previously described.

Figure 3:
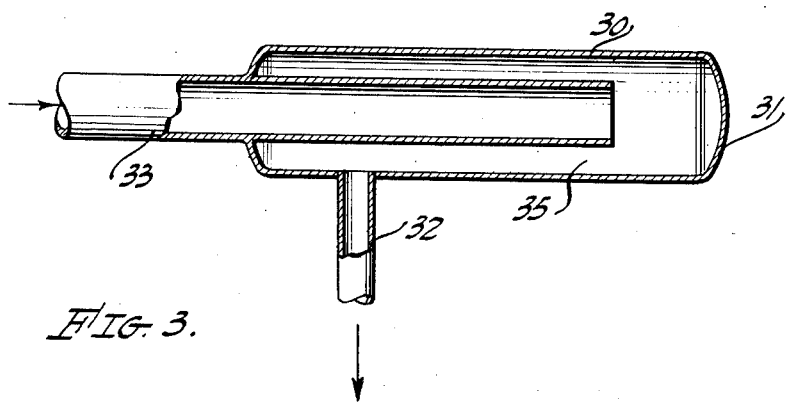

While any of the above types of burner may be satisfactorily employed, I have found it advantageous that the gas mixture be preheated prior to its combustion, and accordingly prefer to employ a burner which permits using the hot combustion products to preheat the incoming reactant gas. Such a burner may be of the so-called "reverse flow" type such as is illustrated by Figure 3. In said Figure 3, the burner comprises a tubular body portion 30 having a closed end 31, and provided with a side arm 32 which serves as an outlet conduit for the combustion products. An inlet conduit 33, smaller in diameter than the body member 31, is concentrically mounted in the open end of the body member and extends inside said body member to a point beyond side arm 32. In operation, the reactant gas mixture is introduced through the inlet conduit 33 into the body of the burner and burns near the open end of conduit 33. Initial ignition of the gas mixture may be effected as previously described or by heating the closed end 31. The products of the combustion strike closed end 31 and suddenly reverse their direction of flow, passing through annular space 35 and being withdrawn through side arm 32. As the hot combustion products pass through annular space 35 they serve to preheat the incoming reactant gas in inlet conduit 33 by simple heat exchange through the walls of the inlet conduit. Preferably, the burner is so constructed that the annular space between the body member and the inlet conduit is of considerable length so as to secure a maximum exchange of heat between the reactant and product gases. While it is preferred to preheat the reactant gas through the use of a burner of this general type, the advantages of preheating the reactants, i. e., higher yield of desired product and a more stable flame, may be secured by employing conventional vapor-to-vapor heat exchangers in combination with other types of burners.

Recovery of the hydrogen cyanide from the reaction product may be effected either by physical or chemical means or by a combination of such means. Thus, for example, the gaseous product may be cooled to atmospheric temperature or below to obtain a liquid condensate comprising water, hydrogen halide, and hydrogen cyanide, together with small amounts of unreacted ammonia and halogenated hydrocarbon. Such liquid condensate may then be fractionally or azeotropically distilled to separate the various components. Ordinarily, it will be desired to separate only the hydrogen cyanide and unreacted halogenated hydrocarbon since the value of the other components does not usually justify their complete separation in pure form.

According to another method of recovering the hydrogen cyanide, the reaction product is passed in the vapor state over a material capable of absorbing the water, eg. g. anhydrous calcium chloride, and the substantially water-free product is then cooled to a temperature below the boiling point of hydrogen cyanide, e. g. below about 26° C., whereby the latter is condensed and may be separated directly from the uncondensed products. Other modes of effecting the separation and recovery of the hydrogen cyanide will be apparent to those skilled in the art. The following examples will illustrate several ways in which the principle of the invention may be applied but are not to be construed as limiting the invention.

*Example I*

Figure 2:
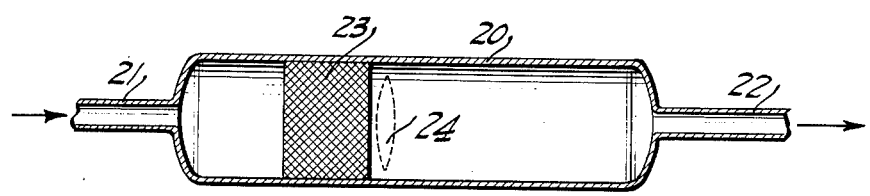

The apparatus employed is similar to that illustrated by Figure 1, the body portion and inlet and outlet conduits comprising a single straight silica tube. The inlet conduit leads to a source of reactant gas, and the outlet conduit is connected to a cold trap maintained at a temperature below the boiling point of hydrogen cyanide. An equimolecular mixture of ammonia, methyl chloride, and oxygen is passed into the tube and is ignited by heating the tube by means of the heating element. The velocity at which the reactant gas mixture is supplied to the tube is so regulated that the mixture burns within the tube with a stable disc-shaped flame. Analysis of the contents of the cold trap shows that hydrogen cyanide is formed in a yield of about 70 per cent based on the quantity of ammonia passed through the tube.

*Example II*

Hydrogen cyanide yields of about 68 per cent, based on the quantity of ammonia employed, are obtained when one mole of ethyl chloride is substituted for each two moles of the methyl chloride employed in the procedure described in Example I.

*Example III*

An equimolecular mixture of ammonia, methyl chloride and oxygen is supplied to the inlet conduit of a "reverse flow" type burner similar to that shown in Figure 3. The outlet conduit of the burner is connected to a cold trap maintained at a temperature of about 0° C. Ignition of the gas mixture within the burner is effected by heating the closed end of the burner, after which the mixture burns by itself without further heating or the addition of added oxygen. Analysis of the contents of the cold trap shows that hydrogen cyanide is formed in a yield of about 83 per cent based on the quantity of ammonia passed into the burner.

While the foregoing description of the invention is limited to a process whereby a reactant gas mixture comprising ammonia, a mono-halogenated aliphatic hydrocarbon, and oxygen is ignited and burned with the formation of a free flame, it will be apparent that other means may be employed to raise the temperature of the gas mixture to a value at which the reaction proceeds readily. Thus, for example, the reaction may be caused to take place by causing the reactants to contact another hot gas, e. g., hot flue gas from a combustion furnace, or by passing the reactant mixture through a secondary flame maintained by the combustion of a hydrocarbon such as natural gas. Also, it will be apparent that suitable burners or equivalent apparatus may take a variety of forms, and that the equipment associated therewith for supplying the reactants to the reaction zone and for recovering and separating the reaction products may comprise any suitable arrangement of conventional apparatus. For example, there may be provided a vaporizing furnace of conventional design to vaporize the liquid halogenated hydrocarbons which may be employed as one of the reactants, and the recovery and separation of the hydrogen cyanide product may be effected in suitable apparatus designed for fractional distillation, selective solvent extraction, moving bed adsorption, etc.

Other modes of applying the principle of my invention may be employed instead of those explained, change being made as regards the materials or methods employed, provided the step or steps stated by any of the following claims, or the equivalent of such stated step or steps, be employed.

I, therefore, particularly point out and claim as my invention:

1. The method for preparing hydrogen cyanide which comprises forming a combustible reactant gas mixture essentially comprising a mono-halogenated saturated aliphatic hydrocarbon having from 1 to 4 carbon atoms, ammonia and oxygen; conducting said mixture through an elongated enclosed preheating zone into a combustion zone; burning said mixture within said combustion zone in the absence of a catalyst and with the formation of a free flame; effecting heat exchange between the hot products of said combustion and the reactant gas mixture passing through said preheating zone by reversing the direction of flow of said hot combustion products and conducting them along the outside of said preheating zone in a direction substantially countercurrent to that of the reactant gas passing through said preheating zone; and subsequently separating nydrogen cyanide from said combustion products.

2. The process of claim 1 wherein the reactant gas mixture contains approximately $n$ moles each of ammonia and oxygen per mole of halogenated hydrocarbon, where $n$ represents the number of carbon atoms in said halogenated hydrocarbon.

3. The process of claim 1 wherein the halogenated hydrocarbon reactant is methyl chloride.

4. The process of claim 1 wherein the oxygen reactant is employed in the form of air.

5. The process of claim 1 wherein the reactant gas mixture contains from about $0.8n$ to about $1.2n$ moles each of ammonia and oxygen per mole of halogenated hydrocarbon, wnere $n$ represents the number of carbon atoms in said halogenated hydrocarbon.

6. The process of claim 5 wherein the halogenated hydrocarbon is methyl chloride.

ART C. McKINNIS.

REFERENCES CITED

The following references are of record in the file of this patent:

UNITED STATES PATENTS

| Number | Name | Date |
|---|---|---|
| 2,006,981 | Andrussow | July 2, 1935 |
| 2,069,545 | Carlisle et al. | Feb. 2, 1937 |